United States Patent [19]
Thompson et al.

[11] 3,942,254
[45] Mar. 9, 1976

[54] TRUE INDEX GEAR TOOTH SPACE CHECKING MACHINE

[75] Inventors: Richard Telman Thompson, Chicago; David Lee Simpson, Elmwood Park, both of Ill.

[73] Assignee: Illinois Tool Works Inc., Chicago, Ill.

[22] Filed: May 30, 1974

[21] Appl. No.: 474,736

[52] U.S. Cl. .................... 33/179.5 R; 33/179.5 D
[51] Int. Cl.² .................... G01B 5/20; G01B 7/28
[58] Field of Search ................ 33/179.5 D, 179.5 R

[56] References Cited
UNITED STATES PATENTS

| | | | |
|---|---|---|---|
| 2,761,560 | 9/1956 | Pomernacki | 33/179.5 R X |
| 3,069,779 | 12/1962 | Bauer et al. | 33/179.5 R |
| 3,281,665 | 10/1966 | Foster et al. | 33/179.5 R X |
| 3,397,459 | 8/1968 | Ehrhardt | 33/179.5 D |
| 3,522,524 | 8/1970 | Smith et al. | 33/179.5 R X |
| 3,800,423 | 4/1974 | Munro et al. | 33/179.5 R |
| 3,849,891 | 11/1974 | Pratt et al. | 33/179.5 D |
| 3,849,892 | 11/1974 | Fabish et al. | 33/179.5 D X |

*Primary Examiner*—Richard E. Aegerter
*Assistant Examiner*—Charles E. Phillips
*Attorney, Agent, or Firm*—Glenn W. Bowen; Robert W. Beart

[57] ABSTRACT

A gear checking machine including a rotary support table and an encoder coupled to the table to give a predetermined number of pulses per revolution of the table is disclosed. A probe, which successively contacts each gear tooth controls the output of a linear variable differential transformer the output of which is supplied to a recorder. When the machine is started, the probe is withdrawn after making contact with the gear and is brought forward to contact each succeeding gear tooth under the control of electronic circuitry which receives the encoder pulses. When a tooth counter reaches a count which indicates that one complete revolution of the gear has occurred, the machine checking cycle is shut off. The probe is driven by a drive eccentric which in turn is driven by a motor coupled to a clutch and a brake that are controlled by the electronic circuitry.

2 Claims, 9 Drawing Figures

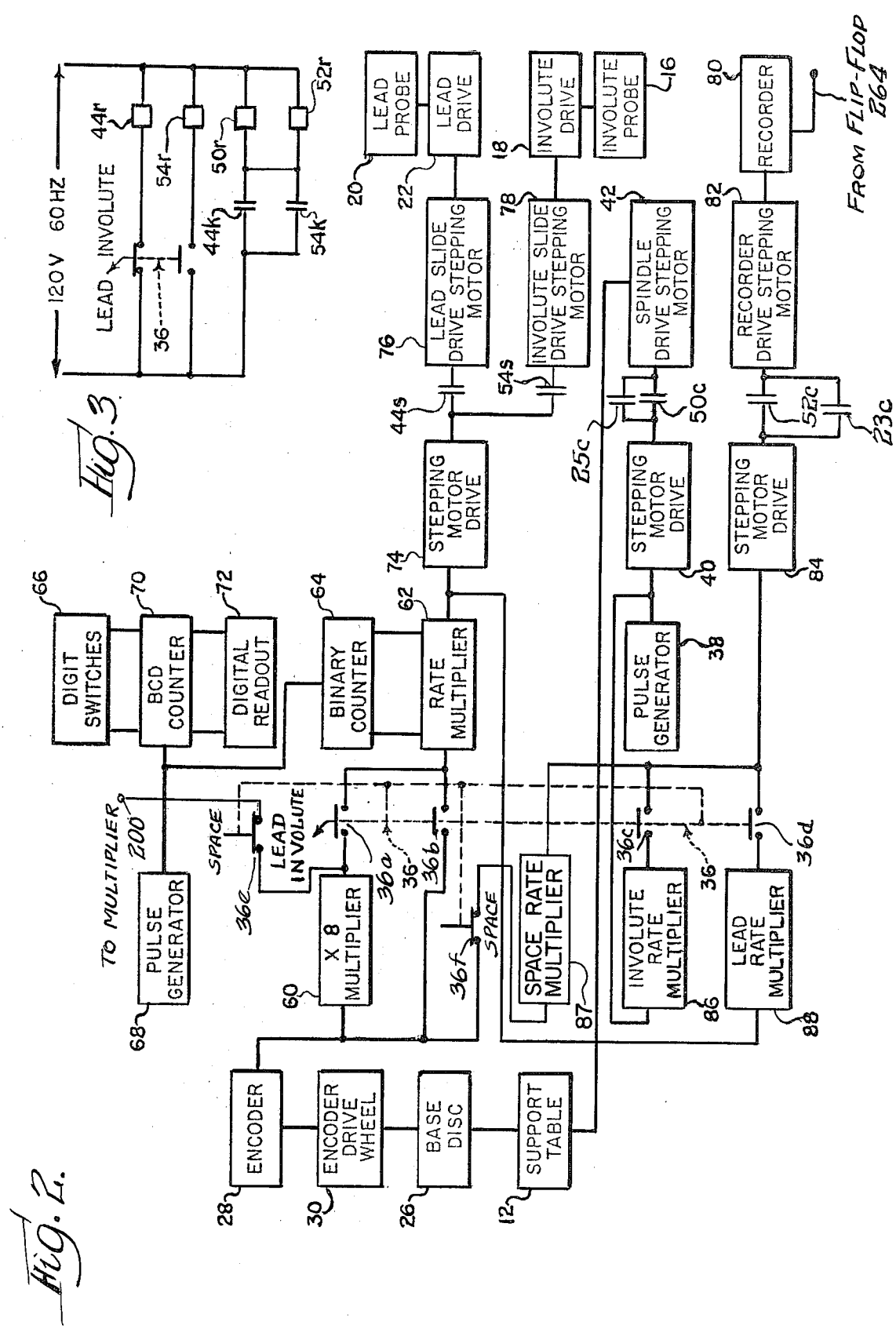

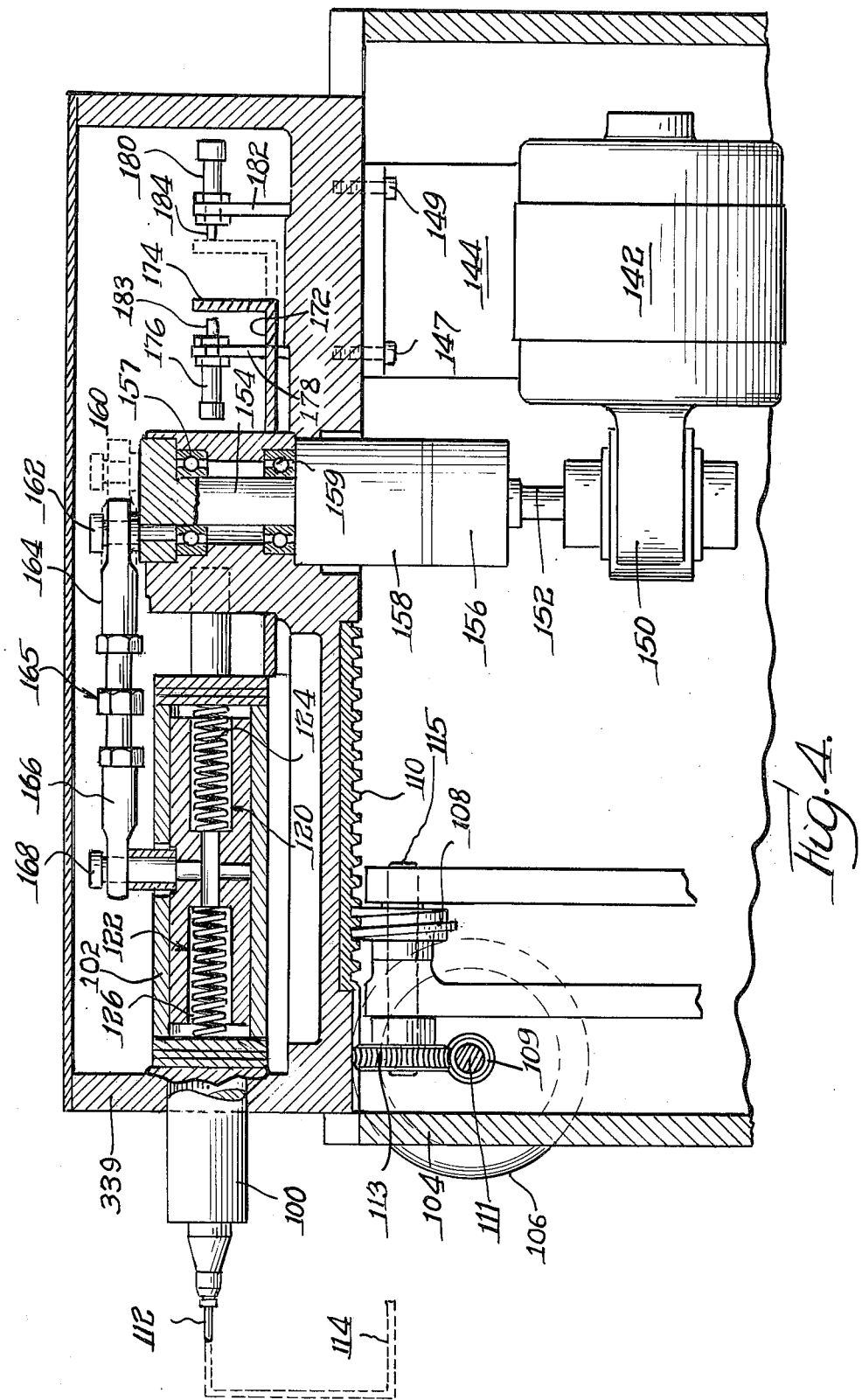

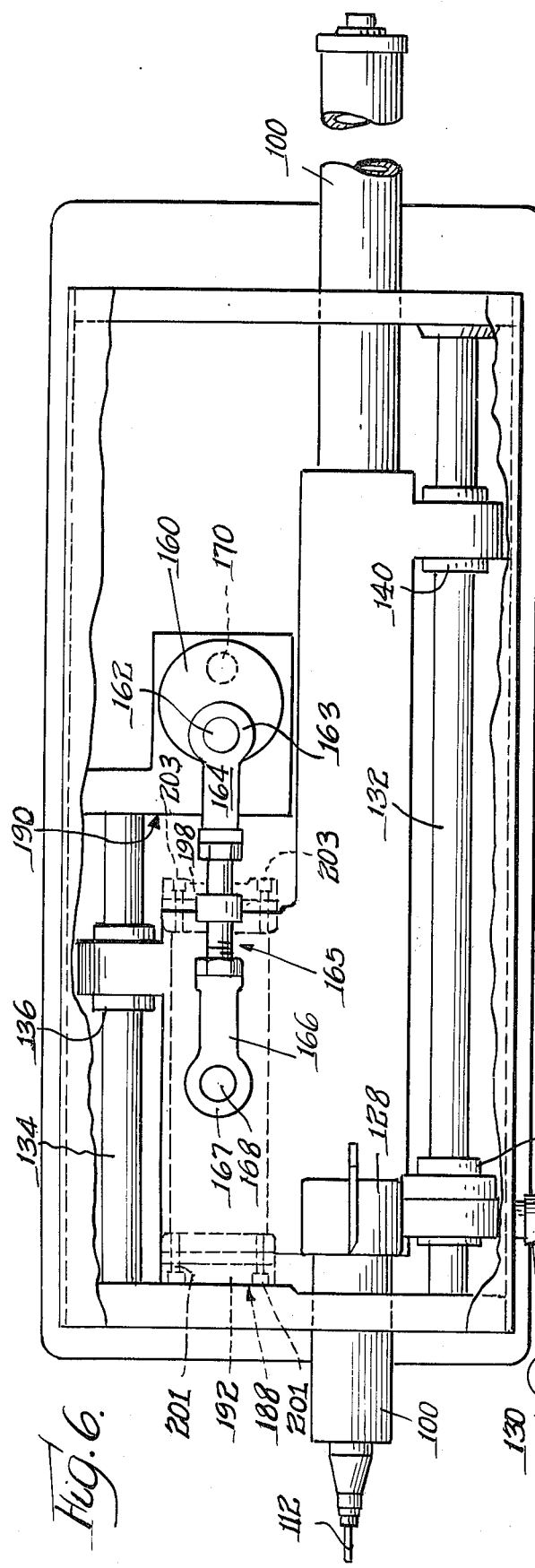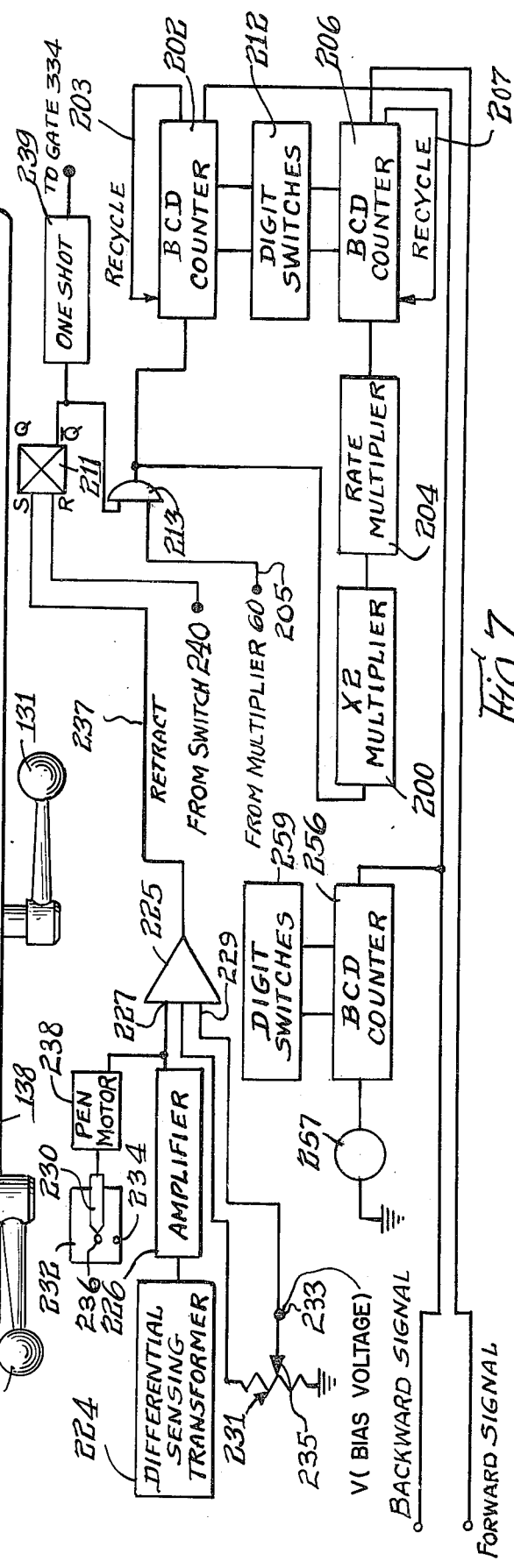

TRUE INDEX GEAR TOOTH SPACE CHECKING MACHINE

BACKGROUND OF THE INVENTION

The present invention is related to automatic gear checking machines and in particular to a machine attachment for automatically checking the true index tooth spacing of both internal and external gears, and other similar components. A true index reading is obtained because the finger of a sensing probe is utilized to engage each tooth of the gear along a constant radius index line. The amount of pressure that is applied to the finger by the gear is translated into a voltage signal by a differential sensing transformer.

In a true index gear tooth space checking machine it is very desirable to be able to check a large range of gear sizes with the same checking machine. It is also advantageous to make such checks while the gear is constantly moving in order to minimize the checking time. Other desirable features in such a checking machine include the ability to check special gear segments with any number of teeth and the ability of obtaining a highly accurate true index reading without first going through one full revolution in order to set the index points. The machine of the present invention is able to utilize all of the above-noted advantages; and in addition, the machine is relatively simple in construction and does not require optical devices or complex mechanical configurations or linkages.

This invention involves a gear checking machine which is particularly useful in measuring helical lead and involute gears, especially large gears, those on the order of 40 to 60 inches or more in diameter. The measurement of the helical lead and of the involute both require an accurate timed relationship between a rotating axis and linearly driven test probe. Prior art involute checkers utilize a ratio bar in conjunction with a master base circle sector or disc. This type of machine had physical limitations which placed severe limitations on the accuracy of the machine and the configuration of the gear support table in the measurement of large gears on the order of 40 to 60 inches or more in diameter. The timed relationship between a rotating axis and linear motion of the helical lead testing machines of the prior art is generally accomplished by a sine bar unit which transmits an accurate angular measurement. Machines incorporating these devices are to be seen in U.S. Pat. Nos. 2,787,060 and 2,998,657.

The present invention eliminates the ratio bar and sine bar and utilizes a large disc or base circle which is coupled to the gear support table. The large base circle is operatively attached to an encoder which accurately registers by electronic pulses the angular or rotary movement of the base disc. The input of this encoder advantageously is achieved by utilizing a very small diameter disc which is normally driven by the outer periphery of the large base disc. This large ratio between the base disc and the encoder disc provides a large range of accuracy in determining the angular movement of the disc.

Two simple discs with properly calculated diameters rotating with each other can provide a much wider range of ratio and accuracy than that obtainable by another device.

A number of advantages are gained by this device in proportioning, manufacturing and in assembly. These are:
1. Flexibility - large ratio range can be obtained.
2. Exact sizes of table and encoder discs are not required because encoder pulses for one revolution of table are counted by a circuit in an electrical panel and inserted into ratio formula.
3. Round configuration - easy to make - easy to manufacture.
4. Positive drive can be obtained by holding the discs in contact by means of springs, adjustable pressure bar, weights, etc.

Thus, it is seen that incorporation of base disc principle in conjunction with stepping motors and gear boxes, provides a wide range of proportioning at a very low cost not possible with other known methods. ss In the machine of the present invention an encoder is attached to a rotary support table which supports the gear that is being checked. The table is driven by a variable speed motor and the encoder produces a predetermined number of pulses per revolution of the table. The total number of pulses that is supplied by the encoder is divided by the number of teeth in the gear being checked so as to provide a specified number of pulses per each gear tooth.

To set up the machine for gear tooth space checking a space checking probe is positioned in the gear tooth space of a first tooth at an appropriate depth so that the end of the finger is placed along a predetermined index line. The machine is then started and the table is rotated so that te probe comes into contact with the gear tooth. At the time the probe comes into contact with the gear tooth, a recording pen is moved to the center of a strip of recording paper, and the probe is withdrawn from the gear under the control of a counter which counts the number of encoder pulses that are generated. The rotary support table starts to turn, and after a predetermined number of pulses per tooth are counted the indicating finger will proceed into the next tooth space so that the end of the sensing finger is again along the true index line. The probe is again moved forward to its forward stop location where the sensing finger waits until it contacts the next gear tooth as the table continuously rotates.

When the probe contacts the next gear tooth, the motion of the probe displaces a magnet in a linear variable differential transformer that is housed in the probe. The resulting output signal from the differential transformer is sent to a recorder so that the pen produces an appropriate recording mark on the recording paper which indicates the displacement of the end of the sensing finger from the nominal true index point. After the counter has reached a count that indicates that the gear has been completely revolved around 360° the machine is shut off, the probe is retracted and the counter is reset. The probe is driven forward and is withdrawn by a constantly rotating motor which drives an eccentric that is coupled to the probe. The motion of the slide mechanism that carries the probe forward and backward actuates limit switches which initiate operations that actuate and deactuate a clutch and a brake coupled to the output shaft of the motor at the proper time.

DESCRIPTION OF THE DRAWINGS

The present invention is shown by reference to the following drawings in which:

FIG. 2 is a block diagram of a portion of the circuitry of the gear checking machine;

FIG. 3 is a block diagram showing a portion of the electrical circuitry of lead and involute gear checking machine;

FIG. 4 is a side, cross-sectional view of the probe and the indicator and drive assembly of the present invention;

FIG. 6 is a top view of the drive and slide mechanism shown in FIGS. 4 and 5;

FIG. 7 is a block diagram which shows a portion of the space checking circuitry;

TECHNICAL DESCRIPTION OF THE INVENTION

Figure 1:
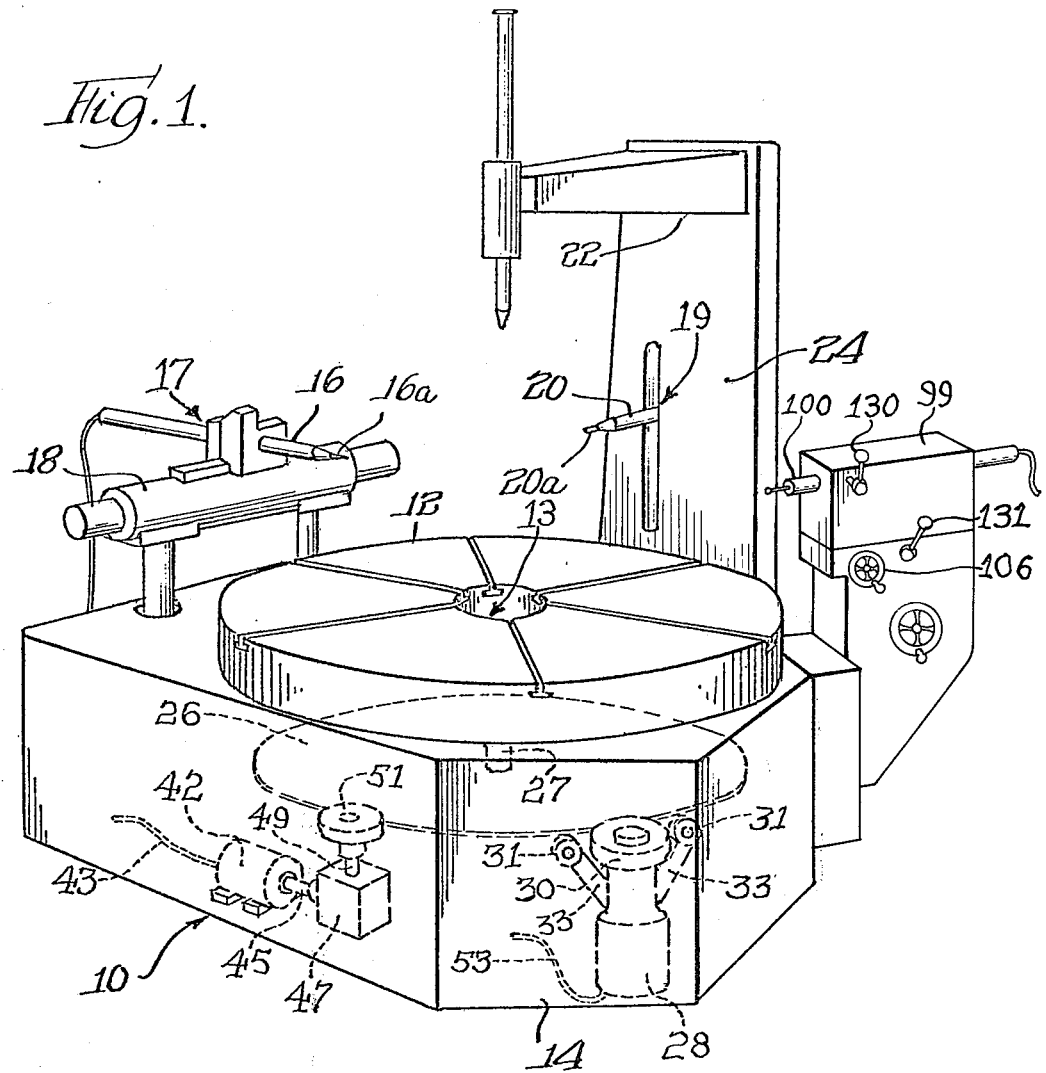
FIG. 1 is a perspective view of the gear checking machine of the present invention.
Figure 5:
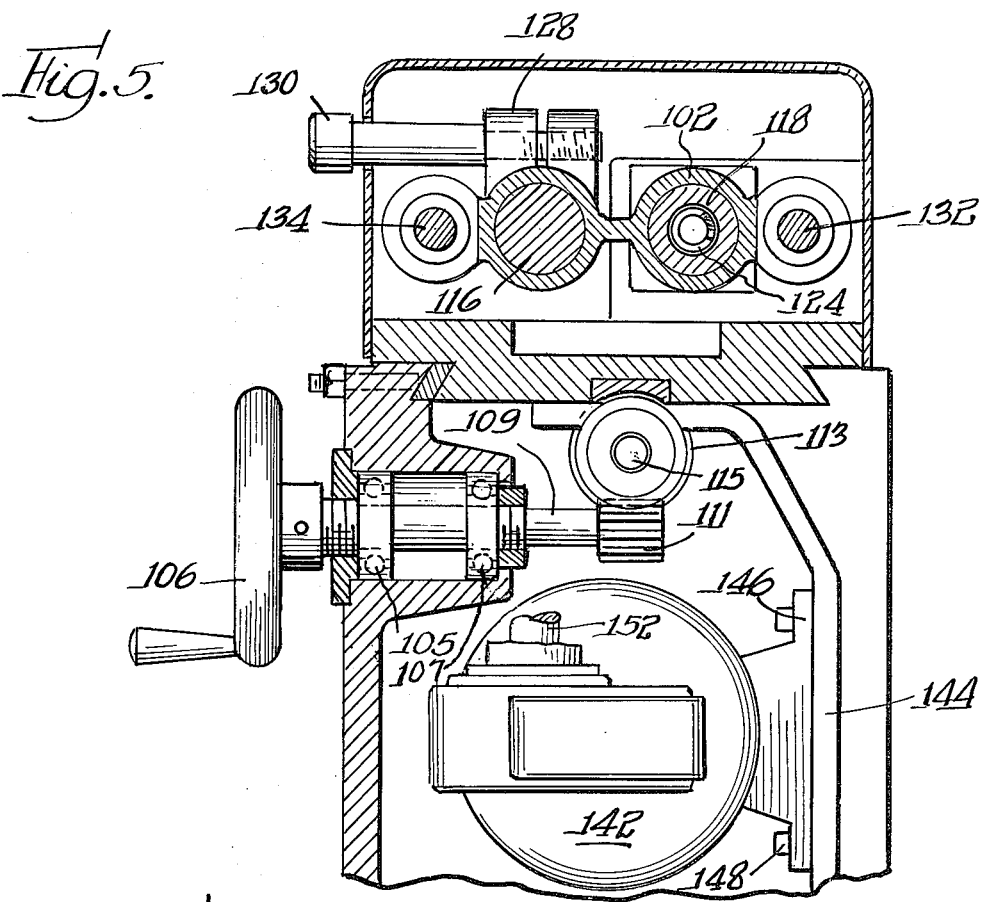
FIG. 5 is an end cross-sectional view of the drive and slide mechanism shown in FIG. 4.
Figure 9:
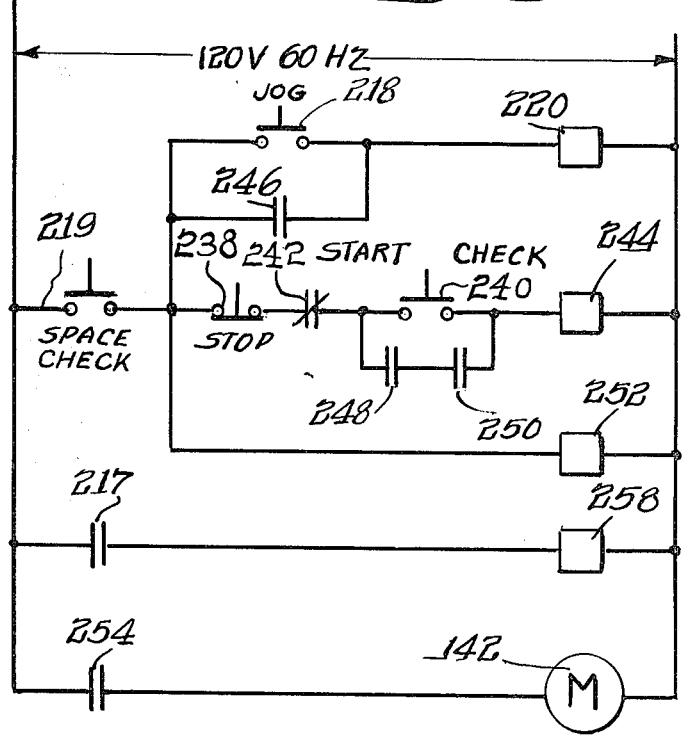
FIG. 9 is a schematic drawing which shows further electrical circuitry employed in the space checking machine of the present invention.

A perspective view of a gear checking machine 10 is shown in FIG. 1. The gear that is to be checked is placed on the large rotatable support means in the form of table 12 which is supported by the base 14. The table drive motor 42 is mounted within the base 14 to rotate the table 12 at a controlled rate. The involute measuring probe 16 is mounted for linear horizontal movement along the involute slide 17 by the involute probe drive mechanism 18. The lead measuring probe 20 is mounted for linear movement in a vertical direction in the elongated slot 19 by the lead probe drive mechanism 22 which is supported by the brace 24. The probes 16 and 20 may be displacement probes of the type generally employed in the gear checking art in which a mechanical displacement of the sensing fingers 16a, respectively, of the probes 16 and 20 control the movement of a magnetic slug in a variable differential transformer (not shown) so as to develop an electrical signal which is a function of the magnitude of the displacement of measuring probe.

On the bottom of the support table 12 and within the base 14, a large circular base disc 26 is secured to the shaft 27 which is in turn coupled to the table 12 so that the table 12 is driven in rotation with the disc 26. Suitable conventional bearings (not shown) are provided to allow for easy rotation of the table 12. An encoder 28 of a conventional type may be mounted to the base 14 by bolts or the like which are inserted into the holes 31 in the arms 33, and has a small driven wheel 30 which is driven by the large disc 26 to provide encoded signals which are representative of the angular rotation of the support table 12. The diameter of the base disc 26 is approximately equal to the diameter of the table 12 and preferably at least ten times as large as the diameter of the encoder wheel 30 to insure that the encoder will respond to relatively small angular rotations of the table 12.

In order to provide for accurate measurement of the involute and the helical lead of a gear, it is necessary that the movement of the support table 12 be accurately synchronized with the linear movement of the involute probe 16 and the lead probe 20. The electrical system of the present invention which achieves the desired control is shown in block diagram in FIGS. 2 and 3.

In the gear checking machine of the present invention, either the involute or the lead may be checked at a given time. Selection of either the lead or involute measuring function is made by the multiple gang selection switch 36 which is shown in FIGS. 2 and 3. The position of the switch 36 in FIGS. 2 and 3 is shown at the lead checking position. When the switch 36 is in the lead checking position, the vertical motion of the lead probe 20 is synchronized with the rotation motion of the table 12. The driving system for the table 12 is achieved by use of a pulse generator 38 which is coupled to a stepping motor drive circuit 40 which supplies driving pulses to the spindle drive stepping motor 42. When the switch 36 is in the lead measuring position, the relay 44r will close the contacts 44k and this will energize both the relays 50r and 52r. The relay 50r acts to close the contact 50c while the relay 52r closes the contact 52c which allows a recorder 80 to be driven at a synchronous rate, as is described subsequently in more detail. When the switch 36 is in the involute position, the relay 54r is energized rather than the relay 44r. This causes the contacts 54k to close thereby again energizing both relays 50r and 52r, and, thus, again closing contacts 50c and 52c.

The spindle drive motor 42 is energized and receives driving signals through the cable 43. As the spindle drive motor 42 is stepped, the output shaft 45 of the motor 42 is driven. The shaft 45 drives the gear box 47 which in turn drives the shaft 49 which is coupled to the friction drive wheel 51. The gear box 47 preferably provides a reduction rate of at least ten to one, and the diameter of the drive wheel 30 is preferably equal to the diameter of the encoder wheel 30. The high resolution of the drive and encoding system of the present invention is illustrated by typical parameters for the components of the system. For example, the diameter of the base disc 26 may be 40 inches. The stepping motor 42 then may make one revolution resulting in one revolution of the encoder 28. If the encoder 28 produces 250,000 pulses in one revolution of the disc 30, then ten revolutions or 2,500,000 pulses will be produced when the table 12 is revolved one turn. It is seen, therefore, that the encoder system of the present invention is one in which each output pulse of the encoder 28 may represent a relatively small amount of angular rotation of the gear being tested. The rotation of the encoder 28 provides a coded representation of the rate of angular displacement of the table 12 which consists of a series of pulses of a rate which corresponds to the rate of rotation of the table 12. This series of pulses from the encoder 28 is supplied through the cable 53 to the multiplier 60 which emits multiple output pulses for every one input pulse that it receives.

The purpose of the rate multiplier 60 is to increase the speed of the lead profile probe 20. It is noted that when the switch 36 is in the involute position, the rate multiplier 60 is bypassed and the output pulse from the encoder 28 is fed directly to the rate multiplier 62. This is because the lead measuring probe 20 must be driven at a faster rate than the involute measuring probe 16 for long leads. Aside from this factor, however, both the involute and the lead probes are controlled in substantially the same manner.

The purpose of the rate multiplier 62 is to provide a series of output pulses which occur at a predetermined fractional rate of the input pulses from the encoder 28. The rate multiplier 62 is constructed to multiply the signal from the encoder 28 by a variable preset factor rather than by a constant factor. In the checking of any given gear, it is necessary to establish, either manually or by means of a recorded program, the appropriate preset factors that are to control the rate multiplier 62 for both the involute and the lead checking cycles. These factors are digital numbers which when contained in the binary counter 64, which is coupled to the rate multiplier 62, establish the appropriate frequency multiplication factor to synchronize the speed of the lead and involute probes 16, 20 with the rate of rotation of the table 12. The rate multiplier 62 is a known type of device, and one suitable type of circuit for use in the present invention is the K184 multiplier sold by Digital Equipment Corporation of Maynard, Mass.

The manner in which the preset multiplication factor is established in the binary counter 64 can be seen by reference to the FIG. 2. The desired digital number which is needed to establish the appropriate ratio of the rate multiplier 62 may be set into the digit switches 66. The pulse generator 68 then supplied pulses to the binary coded decimal (BCD) counter 70, which is initially set to a count that is established by the digit switches 66. The BCD counter 70 counts down to zero. A digital readout 72, which is coupled to the counter 70, supplies a continuous visual indication of the contents of the counter 70. The binary counter 64 is initially at a zero count when the BCD counter 70 is set at the count of the digit switches 66. The binary counter 64 counts up and continues counting until the count established by the digit switches 66 has been reached, at which time the count in the BCD counter 70 will be zero.

With the correct multiplication factor for the rate multiplier 62 being established by the count in the counter 64, the rate multiplier 62 will supply pulses to a conventional stepping motor drive circuit 74 in accordance with the preset factor in the switches 66, thereby providing the required synchronization of the linear motion of the probes 16, 20 with the rotation of the table 12. When the switch 36 is in the lead measuring position, the relay 44r is energized and the contact 44s is closed which allows the stepping motor drive circuit 74 to drive the lead slide drive stepping motor 76 and the lead drive mechanism 22 through the closed contacts 44s. On the other hand, when the switch 36 is in the involute measuring position, the contacts 44s are open and the contacts 54s are closed which allows the stepping motor control circuit 74 to drive the involute slide drive stepping motor 78 and the involute drive mechanism 18 through the closed contacts 54s.

In order to obtain a permanent written record of the gear being checked, a recorder 80 is employed. The recorder 80 is driven by a recorder drive stepping motor 82 which is supplied pulses from the stepping motor drive circuit 84 through the contacts 52c. The recorder stepping motor drive rate is generally different according to whether the involute probe 16 is being driven or the lead probe 20 is being driven. This is achieved through the switch 36 which allows either the involute rate multiplier 86 or the lead rate multiplier 88 to be coupled to the stepping motor control system 84. The rate multiplier 86 and 88 are similar to the multiplier 60 in that they multiply the incoming pulses by a fixed ratio to provide output pulses with a frequency which is suitable for synchronizing the recorder 80 with linear motion of the probes 16, 20 and the rotational motion of the table 12.

The encoder system of the above-described invention provides a number of advantages over conventional encoder systems. The encoder system allows for the use of a relatively inexpensive encoder 28 to produce 10 or more times as many pulses as could be produced by the usual method of mounting. The usual method of mounting would put the encoder on the same axis as the table 12. An encoder mounted in the usual fashion on the axis of the table 12 would have to produce 10 times as many pulses and would be very large and expensive, perhaps eight or 10 times more expensive to do the same job.

Also mounting the encoder to the side of the base disc 26 below the table 12, as shown in FIG. 1, allows for a large hole 13 in the table 12. This is very important because it allows for checking of long shaft type gears by dropping the shaft down the table hole 13 and resting the gear on the table 12. Without a large hole in the gear support table, the utility of a gear checking instrument is severely limited.

The true index space checking attachment 99 to the gear checking machine of FIG. 1 utilizes a space checking probe 100 which is similar in construction to the previously mentioned involute and lead probes 16, 20. The probe 100 measures displacement of the end of the sensing finger 112 or 114 from a the index reference line of constant radius at each gear tooth. Each gear is divided into equal intervals so that all probe contact points for the gear teeth are spaced equally about the constant radius reference line. Each contact point, therefore, occupies the same relative position on each gear tooth because of their equal spacing which is maintained by the counters 202, 206, as will subsequently be described. The space checking probe 100 is mounted in a drive and slide mechanism 339 which is movable back and forth with respect to the frame member 104. The position of the slide mechanism 339 with respect to the gear being checked may be initially adjusted by means of the control wheel 106 which rotates the shaft 109 and the gear 111 which is in mesh with the gear 113. The gear 111 is mounted on the shaft 109 which is supported by the bearings 105, 107. The gear 113 is on the shaft 115 and rotation of the shaft 115 drives the worm gear 108, which meshes with the rack gear 110. A locking arm 131 serves to lock the slide mechanism 339 into place once it is at a desired location. In this manner, the position of the probe 100 may be adjusted to accommodate different size gears.

The probe 100 may be used with either external gears or internal gears. When external gears are to be checked, a short, straight sensing finger 112 is employed; and when internal gears are to be checked, a C-shaped sensing finger 114, which is shown in dotted line representation in FIG. 4, is employed. The probe 100 is positioned in a cavity 116 in the slide mechanism 102. A second cavity 118 is disposed adjacent the cavity 116. The cavity 118 has a rear chamber 120 and a front chamber 122 which receive the coiled springs 124, 126, respectively. The coiled springs 124, 126 act to assure that the slide mechanism 102 is spring loaded against the forward and rear stops 192, 190, thus stopping the slide 102 at the same forward and rear position at each cycle. The probe 100 is locked into place by means of the locking yoke 128 and the locking arm 130. The entire slide mechanism 102 moves backwards and forwards along the slide bars 132, 134 which are engaged by the bearings 136, 138, 140.

A continuously driven fractional horse power motor 142 comprising probe drive means is secured to the bracket 144 by the bolts 146, 148. The bracket 144 is in turn secured to the frame 104 by the bolts 147, 149. The output of the motor 142 is coupled to a drive gear box 150 which drives the shaft 152. The shaft 152 is coupled to the output shaft 154 through the clutch 156 and the brake 158. The shaft 154 passes through the bearings 157, 159. The clutch 156 and the brake 158 are of a conventional design and are controlled by the electrical circuitry of the gear checking machine in a manner which will be described in more detail subsequently. An eccentric 160 is secured to the upper end of the output shaft 154. An arm 164, which is coupled to the slide 102, is secured to the eccentric 160 by a bolt 162 which passes through an aperture 163 at the rear end of the arm 164. The arm 164 forms part of an adjusting turnbuckle 165 which is utilized to initially adjust the forward and backward stroke length of the slide mechanism 102. At the forward end of the adjusting turnbuckle 165 is a second arm 166 which has an aperture 167 in it which receives a bolt 168 that secures the arm 166 to the slide mechanism 102. The motor 142 is controlled by the electrical circuitry so that the eccentric 160 will rotate one half a revolution each time the clutch 156 is energized and the brake 158 is de-energized. When the eccentric 160 rotates a half revolution, the arm 164 is driven between its forward-most position, as shown in FIG. 6, and its rearward-most position at which the bolt 162 will be located at the position 170, which is indicated by the dotted circle in FIG. 6. In this manner, the probe 100 and the sensing finger will be driven forward and backward with respect to the gears being checked. When the gear that is being checked is an external gear, the sensing finger 112 will be driven towards the gear as the slide mechanism 102 is driven forward and will be withdrawn from the gear when the slide mechanism 102 is driven in the reverse direction. On the other hand, when the gear that is being checked is an internal gear, movement of the slide mechanism 102 forward will withdraw the sensing finger 114 from contact with the gear; and movement of the slide mechanism 102 in a reverse direction will bring the sensing finger 114 into contact with the gear.

The slide mechanism 102 has a rearwardly extending switch actuator 172 with an upwardly directed projection 174. A first electrical switch 176 is mounted on a bracket 178 so as to be actuated by the forward motion of the actuator 172 and the second electrical switch 180 is mounted on a bracket 182 so as to be actuated by the rearward motion of the actuator 172. When the sensing finger 112 is brought forward into contact with an external gear, for example, the projection 174 will contact the actuating member 183 of the switch 176 thereby indicating that the sensing probe 100 is in its forwardmost position. On the other hand, when the motor 142 rotates the eccentric one half of a revolution so that the bolt 162 is in the dotted position 170, shown in FIG. 6, the projection 174 will contact the actuator 184 of the switch 180 thereby providing an indication to the control circuitry that the sensing probe 100 is withdrawn to its rearwardmost position. The eccentric 160 rotates one half of a revolution while the probe 100 is being shifted between its forwardmost and rearwardmost positions. Signals provided by the actuation of the switches 176 and 180 are used to initiate selective energization and de-energization the clutch 156 and the brake 158. The limit stops 188, 190 are employed to limit the movement of the slide 102. The limit stops 188, 190 contact members 192, 198 respectively. The members 192, 198 project outwardly of the slide mechanism 102.

Electrical circuitry from the space checking machine of the present invention is represented in FIGS. 2, 7, 8, and 9. The switch 36 of FIG. 2, which is used to select the lead and involute functions of the gear checking machine, is also used to select the space checking function. When the switch 36 is in the space checking position, the switch sections 36a – 36d are all open, while the sections 36e and 36f will be closed. Thus, the output from the encoder 28 will be coupled to the switch section 36f to the space rate multiplier 87. The output of the rate multiplier 87 is coupled to the input of the recorder stepping motor drive circuit 84, while the output of the rate multiplier 60 will be coupled through the switch section 36e to the rate multiplier 200 of FIG. 7 and also to the BCD counter 202. The multiplier 200 doubles the number of input pulses supplied to it from the multiplier 60 and it supplies this signal to the input of the rate multiplier 204. The output of the multiplier 204 is a pulse train which has a greater number of output pulses than are supplied to the multiplier 200 by the rate multiplier 60.

The space checking system utilizes a second BCD counter 206. The counter 202 provides a "back" signal while the counter 206 provides a "forward" signal. The counter 202 counts at a rate which is determined by the number of pulses that are directly supplied by the multiplier 60 on the line 205 while the counter 206 counts at a rate which is determined by the multiplier 200 and the rate multiplier 204. The last stage of the counter 206, therefore, will provide an output pulse before the last stage of the counter 202 provides its output pulse since the counter 206 will reach the end of its count before the counter 202 is finished counting. Digit switch 212 loads the same count into BCD counters 202 and 206. Counter 202 receives pulses from encoder 28 through X8 multiplier 60, space switch 36e and AND gate 213. Counter 202 counts down to zero and recycles at the rate pulses are coming from rate multiplier 60. Counter 206 also receives pulses from multiplier 60, however these pulses go through X2 multiplier 200 and rate multiplier 204 to increase their rate by the proper proportion to move probe 100 forward at the proper time. Thus, the "forward" signal from the counter 206 will appear before occurrence of the "backward" signal from the counter 202. The counters 202, 206 are recycling counters, as shown by the recycling lines 203, 207.

The number of pulses that are required to provide an output signal at the last stage of the counters 202, 206 is determined by the setting of the digit switches 212. The digit switches 212 are set so that the output of the counters 202, 206 are representative of the number of pulses needed for one revolution of the gear divided by the number of teeth in the gear. The "backward" and "forward" signals from the counters 202, 206 are utilized to control the clutch 156 and the brake 158 so as to drive the probe 100 forward and backward in a sequential manner at the proper time so that each tooth of the gear may be checked as the table rotates.

When the gear to be checked is placed on the support table 12, the initial position of the probe 100 with respect to the gear may be adjusted by the wheel 106 or by moving probe 100 in or out in slide 102. Once the initial position of the probe 100 is established, the support table 12 may be controlled by the momentary "jog" switch 218 of FIG. 9 if the "space check" switch 219 is also closed. When the switch 219 and the switch 218 are both closed, the relay 220 will be energized. Energization of the relay 220 causes the contact 25c to close, thereby connecting the stepping motor drive circuit 40 to the spindle drive stepping motor 42 so as to drive the table 12. The table 12 is "jogged" as long as the "jog" switch to 18 is held down.

As the sensing finger 112 or 114 is brought into contact with the first gear tooth, an output signal from the differential sensing transformer 224 occurs due to the displacement of the sensing finger 112 or 114. The output signal from the differential transformer 224 is supplied through the amplifier 226 to the pen motor drive 228. The pen motor drive 228 is part of the recorder 80 and controls the position of the pen 230 with respect to the strip of recording paper 232 in response to the voltage signal from the transformer 224 so that the pen 230 will initially be driven by the pen motor drive 228 from its initial or lowermost position 234 to approximately the center 236 of the recording paper 232. When the pen is at the center position 236, checking of the gear tooth spacing may begin.

At this point, the "jog" switch 218 is open while the "stop" switch 238 and the "space check" switch 219 remain closed. When the "start check" switch 240 is closed an electrical connection is made through the normally closed contact 242 and the closed contacts of the switches 219, 238, 240 so that the relay 244 will be energized. When the relay 244 is energized, the relay contacts 246 and 248 will be closed. The contacts 246 cause energization of the relay 220 even though the "jog" switch 218 is open. This again causes closing of the contacts 25c and the table 12 is thus driven by the motor 42. Since the contacts 250 are also closed by the relay 220, a holding circuit is provided for the relay 244 through the contacts 248, 250 when the momentary "start check" switch 240 is open, thereby allowing the relay 244 to remain energized as long as the "space check" switch 219 remains closed. When the manually operated "stop" switch 238 is opened, the relay 244 will be de-energized.

Upon energization of the relay 244, the contacts 217 will also be closed and the relay 258 will be energized. Closure of the switch 219 also energizes the relay 252. Energization of the relay 252 causes the normally open contacts 254 to close, thereby energizing the motor 142 so that it rotates continuously. When the relay 258 is energized, the contacts 23c are also closed, thereby connecting the output of the stepping motor drive circuit 84 to the recorder drive stepping motor 82 for driving the recorder 80, which includes the pen motor drive 238 and the pen 230 and the recording paper 232. The relay 252 will remain energized even if the "stop" switch 238 is opened as long as the switch 219 is closed. Thus the table 12 and the recorder 80 will stop if the switch 238 is opened, but the motor 142 will remain energized as long as the switch 219 is closed.

After the table 12 has completed one full revolution, the counter 256 will have received a predetermined number of pulses that are representative of this fact. The last stage of the counter 206 is coupled to the input of a BCD counter 256. The counter 256 is controlled in accordance with the setting of the digit switches 259 which are set in accordance with the number of teeth in the gear being checked. Therefore, the counter 256 can be set to provide a single output pulse when the table 12 has completed one full revolution or a predetermined partial revolution in accordance with the number of teeth that are to be checked on the gear and the number of pulses per revolution for the table 12 that are received from the encoder 28. This output pulse from the last stage of the counter 256 is supplied to the relay 257 to energize the relay so that the relay contacts 242 are open thus stopping the checking cycle for the gear.

The input signal from the linear variable differential sensing transformer 224 is coupled through the amplifier 226 to the one input terminal 227 of an absolute value comparator 225. The other input terminal 229 of the absolute valve comparator 225 is coupled to a variable potentiometer 231. The potentiometer 231 has a terminal 233 that is coupled to receive a bias voltage V, and the magnitude of the bias voltage on the terminal 233 and the position of the adjusting arm 235 determines the magnitude of the voltage that will appear on the input terminal 229 of the absolute valve comparator 225. This voltage, therefore, controls the point at which the space checking cycle is initiated in accordance with the position of the pen 230 relative to the recording paper 232. When an output signal is supplied by the absolute value comparator 225 to the retract-load line 237, the pen 230 is preferably at the center 236 of the recording paper 232. The output from the absolute value comparator 225 will then go to a logic level 1 and set a flip-flop 211 so that $\overline{Q}$ output terminal goes to logic level 1 and operates the one-shot multivibrator. The output of the one-shot 239 provides a start signal for starting the automatic reverse and forward operation of the slide mechanism 102, which is controlled and that will subsequently be described in more detail. The $\overline{Q}$ output terminal of the flip-flop 211 also supplies logic level 1 to the AND gate 213 which allows pulses from multiplier 60 to pass through it. The start check switch 240 resets all flip-flops and counters. Pulses coming through AND gate 213 operate BCD counter 202 which produces a retract pulse and operates the tooth counting BCD counter 256. BCD counter 256, upon reaching preset count on digit switch 259, operates relay 257 stopping space checking cycle. Pulses coming through AND gate 213 also go through X2 multiplier 200 and rate multiplier 204 and operate BCD counter 206 which produces a forward signal.

The space checking portion of the gear checking machine described herein employs three controlled flip-flops 260, 262, 264. The state of the flip-flop 260 controls the operation of the clutch 156 while the state of the flip-flop 262 controls the operation of the brake 158. The state of the flip-flop 264 controls the operation of the recorder 80. The flip-flops 260, 262, 264 are preferably formed of inverters that are sold under the designation K113 by the Digital Equipment Corporation of Maynard, Mass. The K113 inverters are interconnected to form an inverting flip-flop which provides a logic level 1 output signal on both the Q and $\overline{Q}$ output terminals when the $\overline{\text{set}}$ and $\overline{\text{reset}}$ terminals receive logic level 0 signals. A logic level "1" output signal is provided on the Q output terminal and a logic level 0 signal on the $\overline{Q}$ output terminal when the $\overline{\text{set}}$ input terminal $\overline{S}$ receives a logic level 0 signal and the $\overline{\text{reset}}$ input terminal $\overline{R}$ receives a logic level 1 signal. When the $\overline{\text{set}}$ input terminal is at a logic level 1 and the $\overline{\text{reset}}$ input terminal is at a logic level 0, the Q output terminal will be at a logic level 0 and the $\overline{Q}$ output terminal will be at a logic level 1. If both the $\overline{set}$ and $\overline{reset}$ terminals are a logic level 1 there will be no change in the state of the flip-flop.

When the space checking function is initiated, it is desirable to reset flip-flops 260, 262, 264. This may be achieved by means of the contacts 240a which may be closed simultaneously with the closure of the "start check" switch 240 of FIG. 9 so as to couple the supply voltage at the terminal 241 to the flip-flops 260, 262, 264 thereby driving them into their reset states. Alternately, the circuit of these flip-flops could be designed so that the desired presetting could be achieved through circuit design upon the initial actuation of the space checking circuitry, if desired.

The slide mechanism 102 may be driven to its forwardmost position by closing the "manual" forward switch 272 when the projection 174 lies between the actuators 182, 184 of the switches 176, 180, respectively. In a similar manner, the slide mechanism 102 can be driven to its rearwardmost position from this location by closing the "manual" back switch 274. The switches 272, 274 are interlocked so that only one of them may be closed at any given time.

If the switch 272 is actuated, the 120 volt input voltage signal from the input line will be coupled across the primary winding 278 of the transformer 280 to its secondary winding 282. The output of the secondary winding 282 is coupled to an AC/DC converter 284, the output of which is a logic level 1 signal. Whenever the switch 272 is closed the slide mechanism will be driven forward if the contacts 286, 288 are closed and switch 176 is not closed.

Figure 8:
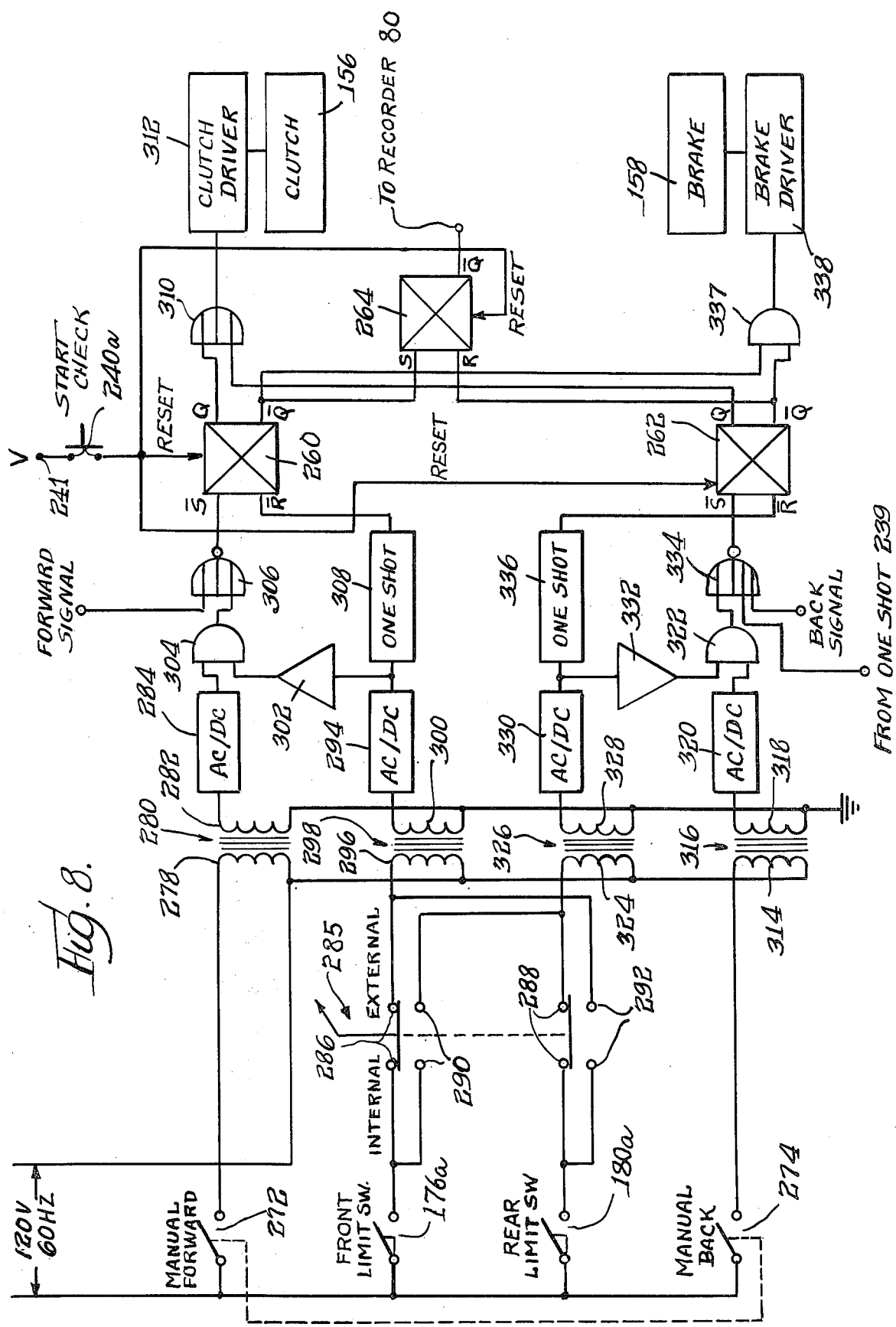
FIG. 8 is another block diagram which shows an additional portion of the space checking circuitry.

When an external gear is being checked, the internal-external switch 285 will be in the "external" position, as shown in FIG. 8, in which the switch contacts 286, 288 are closed. If an internal gear is being checked, the switch 285 will be in the opposite or "internal" position, and the contacts 290, 292 will be closed, rather than the contacts 286, 288. While the slide mechanism is being driven in the forward direction, a logic level 0 signal will be present at the output of the AC/DC converter 294 since there will be no input signals coupled to the primary winding 296 of the transformer 298 to the secondary winding 300. The output of the AC/DC converter 294 is coupled to an inverter 302, the output of which is coupled to an AND gate 304 that receives an input from the AC/DC converter 284. When the manual forward switch 272 is closed the output of the converter 284 will be at a logic level 1; the output of the inverter 302 is then at a logic level 1. The AND gate 304 then produces a logic level 1 output signal. The output of the AND gate 304 is coupled to a OR gate inverter 306. The logic level 1 output signal from the OR gate inverter 306 is converted to a logic level 0 pulse signal by inversion and is supplied to the $\overline{set}$ input terminal $\overline{S}$ of the flip-flop 260. The one-shot multivibrators 308 and 336 are constructed so as to provide logic level 1 output signals when their inputs are at a logic level 0 and to provide logic level 0 pulses of a predetermined duration when their input goes to a logic level 1. Therefore, the $\overline{R}$ or $\overline{reset}$ input terminal of the flip-flop 260 will have a logic level "1" signal applied to it simultaneously with the application of a logic level 0 signal to the $\overline{S}$ or $\overline{set}$ input terminal by the OR gate inverter 306 to set the flip-flop 260. When the flip-flop 260 is set the Q and $\overline{Q}$ output terminals of the flip-flop 260 will respectively have logic level 1 and logic level 0 outputs.

The $\overline{Q}$ output terminals of the flip-flops 260, 262 are coupled to the AND gate 337 and Q output terminals of the flip-flops 260, 262 are coupled to the OR gate 310. Therefore, when the flip-flops 260, 262 are initially reset, the output of the AND gate 337 to the brake driver 338 will be at a logic level 1, which will energize the brake 158 and the output of the OR gate 310 to the clutch driver 312 will be at a logic level 0 which will deenergize the clutch 156. Then, when either the flip-flop 260 or the flip-flop 262 are set (i.e. a logic level 1 output appears on the Q output terminal), the output of the OR gate 310 will go to logic level 1; and the output of the AND gate 337 will be at a logic level 0, which will cause energization of the clutch 156 and de-energization of the brake 158.

The manual back switch 274 is coupled to the primary winding 314 of the transformer 316. The secondary winding 318 of the transformer 316 is coupled to the AC/DC converter 320, the output of which is coupled to one input of the AND gate 322. Closure of the switch 274 causes the output of the converter 320 to go to a logic level 1. With the "internal-external" switch 285 in its "external" position and the switch contacts 176a are open, no input signal will be coupled from the primary winding 324 of the transformer 326 to the secondary winding 328. The secondary winding 328 of the transformer 326 is coupled to the AC/DC converter 330 and thus the output of the converter 330, which is coupled to an input of an inverter 332, will be at logic level 0. The output of the inverter 332 is coupled to a second input of the AND gate 322. When the output of the converter 330 is at a logic level 0 the inverter 332 is at a logic level 1 and the output of the converter 320 is at a logic level "1"; the output of the AND gate 322 goes to a logic level 1. The output of the AND gate 322 is coupled to one input of the OR gate inverter 334 so that when the OR gate inverter 334 receives the logic level 1 input pulse from the AND gate 322 it produces a logic level 0 pulse output to the set input terminal $\overline{S}$ of the flip-flop 262. The output of the converter 330 is at a logic level 0 when the switch contact 176a is open, and the output of one-shot multivibrator 336 will then be at a logic level 1. The output of the one-shot 336 thus applies a logic level 1 pulse to the $\overline{reset}$ input terminal $\overline{R}$ of the flip-flop 262 which causes the flip-flop 262 to be set so that its Q output terminal provides a logic level 1 output signal, while its $\overline{Q}$ output terminal provides a logic level 0 output signal.

The slide mechanism 102 will move forward or backward when the switch 272 or the switch 274 is closed until the actuator 172 actuates either the front limit switch 176 or the rear limit switch 180. When either of the contacts 176a or 180a are closed due to actuation of the switch 176 or the switch 180, the output of the converter 330 or the converter 294, according to which of the switches 176 or 180 is actuated, will go from a logic level 0 to a logic level 1. When the output of the converter 330 or the converter 294 is at a logic level 1, the output of the associated one-shot 336 or 338 will go to a logic level 0 for a predetermined pulse time; and the output of the associated inverter 332 or 302 will also go to a logic level 0. Thus, the output of the AND gate 322 or of the AND gate 304, will go to a logic level 0 which will be inverted by the OR gate inverter 334 or the OR gate 306 to a logic level 1 output signal. When the output of the OR gate inverter 334, or the output of the OR gate inverter 306, is at a logic level 1, the associated flip-flop 262 or 260 will thus have a logic level 1 signal on its $\overline{S}$ or $\overline{set}$ input terminal and a logic level 0 pulse on its $\overline{\text{reset}}$ terminal $\overline{\text{R}}$ for a predetermined pulse time. This will cause either the flip-flop 260 or 262 to again be reset according to which one of the switches 176 or 180 has been actuated by the actuator 172.

In the automatic checking mode for the space checking function, the manual switches 272, 274 remain open. The output of the converters 284, 320 will then remain at a logic level 0. The output of the AND gate 304, 322 will thus remain at a logic level 0 also; and control for the setting of the flip-flops 260, 262 will be determined by the signals applied to the OR gate inverters 306, 334. Control of the setting of the flip-flop 260 will be achieved solely to the "forward" signal which is supplied from the last stage of the counter 206 to the input of the OR gate inverter 306. Control of the setting of the flip-flop 262 is similarly achieved by the "backward" signal which is supplied from the last stage of the counter 202 to the input of the OR gate inverter 334, or alternately upon the initial contact of the sensing finger 112 or 114 with the gear when the space checking cycle is started by the output signal from the one-shot 239.

When an external gear is being checked and the slide mechanism 102 is being moved forward, the front limit switch 176 will not be actuated and the contacts 176a will be open, thus, causing a logic level "1" signal to be supplied at the output of the one-shot 308 and to the $\overline{\text{reset}}$ input terminal $\overline{\text{R}}$ of the flip-flop 260. The application of a logic level 1 signal on either the output of the AND gate 304 or the "forward" signal line will cause the output of the OR gate inverter to provide a logic level 0 signal. With a logic level 0 signal in the $\overline{\text{S}}$ input terminal and a logic level 1 signal in the $\overline{\text{R}}$ input terminal of the flip-flop 260, the flip-flop 260 will be set. Setting of the flip-flop 260 causes the OR gate 310 to provide a logic level 1 signal to the clutch driver 312 to energize the clutch. At the same time the flip-flop 260 causes the AND gate 337 to provide a logic level 0 output signal to the brake driver 338 which de-energizes the brake 158.

During the time that the clutch 156 and the brake 158 is de-energized, the motor 142 drives the eccentric 160 one-half of a revolution so that the probe 100 is moved forward into contact with the gear and the bolt 162 is at the position shown in FIG. 6.

When the slide 102 operates the front limit switch 176, the output of the one-shot 308 will go from a logic level 1 to a logic level 0 for a predetermined pulse time. Upon coincidence of the logic level 0 input signal on the $\overline{\text{reset}}$ input terminal $\overline{\text{R}}$, reapplication of a logic level "1" signal on the $\overline{\text{set}}$ input terminal $\overline{\text{S}}$, the flip-flop 260 will be reset. When the flip-flop 260 is reset, the Q output terminal will go to a logic level 0 while its $\overline{\text{Q}}$ output terminal will go to a logic level 1. This in turn will cause a logic level 1 signal to be supplied by the AND gate 337 to the brake driver 338 which will energize the brake 158. Simultaneously, a logic level 0 signal will be supplied by the OR gate 310 to the clutch driver 312 which will de-energize the clutch 156.

The action of the rear and front limit switches 180, 176 is reversed when an internal gear is being checked and the switch 285 is changed to the "internal" position. The "internal-external" switch 285 reverses the connection of the contacts 176a, 180a with respect to the primary windings 296 and 324 of the transformers 298, 326. In this instance, the rear limit switch 180 will act to control the flip-flop 260 rather than the flip-flop 262; and the front limit switch 176 will act to control the flip-flop 262 rather than the flip-flop 260, since the sensing finger 114 will be withdrawn from an internal gear by moving the slide mechanism 102 in a forward direction while withdrawal of the sensing finger 112 from an external gear will occur by movement of the slide mechanism in the rearward direction.

When checking an internal gear, the slide mechanism 102 will initially be driven rearward to contact with a gear tooth. After the slide mechanism 102 has been drawn to its rearwardmost position and the projection 174 on the actuator 172 has actuated the rear limit switch 180 so as to close the contacts 180a. When the contacts 180a are closed, the output of the one-shot 308 will produce a logic level 0 for a predetermined pulse time, which allows the flip-flop 260 to be driven to be reset due to the occurence of a logic level 1 on the output of the OR gate inverter 306 to the $\overline{\text{set}}$ input terminal $\overline{\text{S}}$ of the flip-flop 260 at this time. When the output stage of the counter 202 provides a "forward" signal of a logic level 1 to the input of the OR gate inverter 306 during the time after the output of the one-shot 308 has returned to a logic level 1, the flip-flop 260 will be set since the output of the OR gate inverter 306 will be pulsed to logic level 0 at this time. When the flip-flop 260 is set, a logic level 1 signal will appear on the Q output terminal and a logic level 0 signal will appear on its $\overline{\text{Q}}$ output terminal. The clutch 156 will thus be energized and the brake 158 will be de-energized causing the motor 142 to again drive the eccentric 160 through another one-half revolution so as to drive the sensing finger 114 rearward to the position 170, shown in FIG. 6 by dotted lines.

When the "forward" signal to the OR gate inverter 306 is terminated, the output of the OR gate inverter 306 will go to a logic level 1; and the output of the OR gate inverter 334 will be at a logic level 1; and thus, when the output of the one-shot multivibrator 336 goes to a logic level 0 state for a predetermined pulse time upon closure of the contacts 176a, the flip-flop 262 will be reset causing a logic level 0 output signal to be produced on its Q output terminal. This logic level 0 output signal will be supplied to the OR gate 310 and with the flip-flop 260 also reset, the clutch 156 is de-energized. The $\overline{\text{Q}}$ output terminal of the flip-flop 260 will be at a logic level 1 at this time; and thus, the AND gate 337 will supply a logic level 1 to the brake driver 338 to energize the brake 158. The slide mechanism 102 will, therefore, be stopped at its forwardmost position until the "backward" signal is produced by the counter 202.

The slide mechanism 102 is now driven forward so that the sensing finger 114 clears the oncoming gear tooth after the actuator 172 has actuated the switch 176 so as to close the contacts 176a. When the contacts 176a are closed, the output of the oneshot 336 will drop to a logic level 0 for a predetermined pulse time, which allows the flip-flop 262 to be reset due to the occurence of a logic level 1 on the output of the OR gate inverter 334 to the $\overline{\text{set}}$ input terminal $\overline{\text{S}}$ of the flip-flop 262 at this time. When the output stage of the counter 206 provides a "backward" signal of a logic level 1 to the input of the OR gate inverter 334 after the output of the one-shot 336 has returned to a logic level 1, the flip-flop 262 will be set since the output of the OR gate inverter 334 will be pulsed to logic level 0 at this time. The brake 158 is de-energized and the clutch 156 is energized, resulting in another one-half revolution of the eccentric 160 during the time flip-flop 262 remains set. This one-half revolution of the eccentric 160 causes the sensing finger 114 to be driven forward out of contact with the last contacted gear tooth. When the next gear tooth is to be contacted by the sensing finger 114, the cycle is repeated and the slide mechanism 102 is again brought backward and forward in the manner described.

The recorder 80 is activated only when the flip-flop 264 is reset so that the $\bar{Q}$ output terminal of the flip-flop 264 provides a logic level 1 signal to the recorder 80. This occurs when the flip-flops 260 and 262 are reset so that the clutch 156 will be deenergized and the brake 158 will be energized, and the probe 100 is stationary and in position to make contact with the gear tooth that is being tested.

The invention is claimed as follows:

1. In an apparatus for recording in succession the deviation of a predetermined point of each of a series of teeth on a gear from a constant radius reference line comprising probe means for sensing said deviation of each of said gear teeth, sensing means mounted on said probe means and being movable with respect to said probe means upon contact with said teeth to provide an electrical signal that varies with said deviation of each of said teeth from said reference line, recording means responsive to said sensing means for recording each of said deviations, rotatable support means for said gear, support drive means for rotating said support means and said gear and endocer means driven by said drive means for providing electrical pulse signals representative of the amount of rotation of said support means and said gear between each successive predetermined point; the improvement comprising control circuity coupled to said encoder means for converting said electrical pulse signals to a repetitive succession of "forward" command signals and "backward" command signals that are precisely spaced in accordance with the number of teeth on said gear, probe drive means coupled to said digital processing means constructed to drive said probe means forward toward each of said gear teeth at said predetermined points upon the generation of a "forward" command signal and backward away from each of said gear teeth upon the generation of "backward" command signal, said probe drive means comprising a continuously rotating motor, an output shaft for said motor, a brake means coupled to said output shaft, a clutch means coupled to said output shaft, an eccentric coupled to said output shaft, an arm member connected between said eccentric and said probe means for driving of said probe means towards said gear during one-half revolution of said output shaft and said eccentric and for driving of said probe means away from said gear during the next one-half revolution of said output shaft and said eccentric, brake energization means and clutch energization means coupled to said control circuitry and constructed to respectively de-energize said brake means and to energize said clutch means in response to said "forward" and said "backward" command signals in order to achieve synchronization of said probe drive means with the rotation of said support means, forward limit switch means accuated by said probe drive means when said probe means is adjacent one of said predetermined points of said gear teeth for terminating the drive of said probe means toward said gear following the generation of "forward" command signal and prior to the generation of the next "backward" command signal and backward limit switch means accuated by a said probe drive means upon withdrawal of said probe means from the last contacted gear tooth by a predetermined amount following the generation of a "backward" command signal and prior to the generation of the next "forward" command signal wherein the actuation of one of said forward or of said backward limit switch means terminates each one-half revolution of said eccentric, wherein said probe drive means comprises a housing, a frame, stop means and a coiled spring wherein said housing is slideable in said frame and has a first cavity therein which receives said probe means and a second cavity therein adjacent to said first cavity which receives said coiled spring, said coiled spring being compressed when said probe means contacts said stop means such that said probe means stops at approximately the same position upon the contact of each gear tooth and such that the forward drive impact of said probe means is cushioned thereby.

2. An apparatus as claimed in claim 1 comprising an automatic start means for starting said recording means and for withdrawing said probe means from its initial contact point following the initial contact of said probe means with said gear.

* * * * *